(12) United States Patent
Walczyk et al.

(10) Patent No.: US 8,511,362 B2
(45) Date of Patent: Aug. 20, 2013

(54) CONSOLIDATING AND CURING OF THERMOSET COMPOSITE PARTS BY PRESSING BETWEEN A HEATED RIGID MOLD AND CUSTOMIZED RUBBER-FACED MOLD

(75) Inventors: Daniel Walczyk, Brunswick, NY (US);
Casey Hoffman, Troy, NY (US);
Michael Righi, Cobleskill, NY (US);
Suvranu De, Waterford, NY (US);
Jaron Kuppers, Troy, NY (US)

(73) Assignee: Edwin H. Kintz, Schenectady, NY (US)

( * ) Notice: Subject to any disclaimer, the term of this patent is extended or adjusted under 35 U.S.C. 154(b) by 171 days.

(21) Appl. No.: 12/685,435

(22) Filed: Jan. 11, 2010

(65) Prior Publication Data
US 2010/0181018 A1  Jul. 22, 2010

Related U.S. Application Data

(60) Provisional application No. 61/205,198, filed on Jan. 16, 2009.

(51) Int. Cl.
*B29C 35/02* (2006.01)
*B29C 33/40* (2006.01)

(52) U.S. Cl.
USPC ........... 156/500; 156/286; 156/381; 425/394; 425/405.2; 425/411; 425/DIG. 44

(58) Field of Classification Search
USPC ................. 156/381, 228, 285, 286, 242, 245, 156/500, 581; 425/405.2, 420, 405.1, 411, 425/408, DIG. 44, 394
See application file for complete search history.

(56) References Cited

U.S. PATENT DOCUMENTS 3,666,600 A * 5/1972 Yoshino ......................... 156/382
3,677,998 A * 7/1972 Young ............................ 524/178

(Continued)

FOREIGN PATENT DOCUMENTS

DE       3644144 A1 *  7/1988

OTHER PUBLICATIONS

Cytec Industries, "CYTEC Engineered Materials > Composite Prepregs > Selector Guide", published on-line Feb. 13, 2008, available at http://web.archive.org/web/20080213085444/http://www.cytec.com/engineered-materials/selectorguide.htm, 40 pages.*

(Continued)

*Primary Examiner* — William Bell
(74) *Attorney, Agent, or Firm* — Notaro, Michalos & Zaccaria P.C.

(57) ABSTRACT

Method and apparatus for consolidating and curing a composite part places and registers a composite laminate layer of thermoset polymer matrix and reinforcing fibers onto the temperature-controlled curing surface of a heated curing mold and provides a base mold with base surface covered by a rubber mask having a mask surface. Three-dimensional surfaces of the curing, base and mask surfaces complement each other so with the curing and base molds adjacent, a pressure space is formed between the base and curing surfaces that contains the compressed rubber mask, a bleeder layer for removing excess air and polymer matrix, and the composite laminate, the pressure space having a perimeter. The base and curing molds are pressed together with a particular force, thereby creating a uniform hydrostatic pressure at the rubber mask and composite laminate interface by virtue of the mold and mask three-dimensional surfaces and rubber mask thickness distribution, to squeeze the composite laminate during consolidation and curing of the part. A vacuum is also applied to the perimeter of the composite laminate during consolidation.

4 Claims, 5 Drawing Sheets

(56) References Cited

U.S. PATENT DOCUMENTS

| | | | | |
|---|---|---|---|---|
| 3,723,497 A * | 3/1973 | Baney | .......................... | 524/588 |
| 3,840,239 A * | 10/1974 | Fazekas et al. | ................ | 277/644 |
| 4,659,304 A * | 4/1987 | Day | .............................. | 425/406 |
| 4,889,668 A | 12/1989 | Kemp | | |
| 5,131,834 A * | 7/1992 | Potter | .......................... | 425/389 |
| 5,643,522 A | 7/1997 | Park | | |
| 5,648,137 A | 7/1997 | Blackmore | | |
| 5,656,231 A | 8/1997 | Blackmore | | |
| 5,714,179 A * | 2/1998 | Goodridge et al. | ........... | 425/394 |
| 6,149,844 A | 11/2000 | Graham | | |
| 2007/0084967 A1 * | 4/2007 | Polus | ........................... | 244/133 |

OTHER PUBLICATIONS

Machine translation of Kober (DE 3644144 A1) into English, 4 pages.*

Machine translation of Kober (German Patent Publication No. DE 3644144 A1), originally published Jul. 7, 1988, 7 pages.*

Rufe, P.D. (Editor), Fundamentals of Manufacturing, 2nd Ed., Society of Manufacturing Engineers, 2002.

Composite Application Market Assessment—A Global Overview, Frost & Sullivan (www.frost.com), published May 13, 2008.

http://www,compositesworld.com/articles/nacelle-manufacturers-optimize-hand-layup-and-consider-closed-molding-methods.aspx?terms=%40pub_CW_type+%3d++Feature, published May 1, 2004.

Bullen, G.N., "Get Rid of Those Autoclaves!" Manufacturing Engineering (Society of Manufacturing Engineers), vol. 140, No. 3, Mar. 2008.

Morey, B., "Automating Composites Fabrication," Manufacturing Engineering (Society of Manufacturing Engineers), Apr. 2008 vol. 140 No. 4, Apr. 2008.

Aronson, R., "Composites & Superalloys Fill Aerospace Needs," Manufacturing Engineering (Society of Manufacturing Engineers), vol. 140, No. 3, Mar. 2008.

http://media.photobucket.com/image/vacuum%20bagging%20composites/ebayPCI/VacuumBagLayup.jpg, accessed on Nov. 10, 2009.

Strong, A.B., Fundamentals of Composites Manufacturing: Materials, Methods, and Applications, 2nd Edition, Society of Manufacturing Engineers, Dearborn, MI, 2008.

Blair, Michael. Composites: Success, Opportunity and Challenge. Composites Manufacturing Conference, 2007, Society of Manufacturing Engineers, Apr. 12, 2007.

J N Hay, J.N. and O'Gara, P., 2006, "Recent developments in thermoset curing methods," Proceedings of the Institution of Mechanical Engineers, Part G: Journal of Aerospace Engineering, vol. 220, No. 3, pp. 187-195, Jan. 2006.

http://www.carbonbydesign.com/features/features_bladder.asp, accessed on Nov. 10, 2009.

http://www.quickstep.com.au/what-is-quickstep/how-quickstep-works, accessed on Sep. 20, 2008.

http://compositecenter.org, accessed on Nov. 10, 2009.

http://www.greenhulk.net/forums/showthread.php?t=22098, accessed on Nov. 10, 2009.

Haslinger, J. and Mäkinen, R., Introduction to Shape Optimization: Theory, Approximation and Computation. Society for Industrial and Applied Mathematics, 2003.

Quote from Bondtech Corporation, Somerset, KY for a Model BCT56"x6'2"-300P-302F autoclave received by Kintz Plastics on Apr. 23, 2008.

(not yet published) Hoffman, C., "Development of an Advanced Composites Manufacturing Facility," M.S. Thesis, Department of Mechanical, Aerospace & Nuclear Engineering, Rensselaer Polytechnic Institute, Troy, NY, 2009.

* cited by examiner

CONSOLIDATING AND CURING OF THERMOSET COMPOSITE PARTS BY PRESSING BETWEEN A HEATED RIGID MOLD AND CUSTOMIZED RUBBER-FACED MOLD

CROSS-REFERENCE TO RELATED APPLICATION

This application claims priority on U.S. provisional patent application No. 61/205,198 filed Jan. 16, 2009, which is incorporated herein by reference.

FIELD AND BACKGROUND OF THE INVENTION

1. Motivation

The present invention relates generally to the field of composites and in particular to a new and useful consolidation and curing of composite parts by thermal pressing using a heated rigid tool and matched rubber tool.

The term "advanced composites" is generally understood to mean a polymer matrix reinforced by high-strength, high-modulus fibers of a predetermined orientation [Ref. 1—Rufe, P. D. (Editor), *Fundamentals of Manufacturing*, 2nd Ed., Society of Manufacturing Engineers, 2002]. Advanced composites use very stiff and strong, yet lightweight fibers of glass, carbon/graphite, Kevlar® (a registered trademark of E.I. du Pont de Nemours and Company for aramid fibers), boron, other organic materials and hybrid fiber mixes that are in woven, unidirectional, or continuous strand mat form. The polymer resin or "matrix" that holds the fibers together and transfer load can either be thermoset (e.g. epoxy, phenolic, bismaleimide and polyimide) or thermoplastic (e.g. nylon, polyester, polysulfone, polyphenylene sulfide, and PEEK). Composites that consist of layers bonded together are referred to as laminates, whereas a structure consisting of a low-density core (e.g. foam, honeycomb) between thin composite faces is called a sandwich.

The use of advanced composite materials has grown and continues to grow steadily, because their structure and processing can be tailored to applications requiring high strength, high stiffness, low weight, and/or low thermal conductivity. Typical products where advanced composite parts are used include aerospace structures (e.g. Boeing 787 Dreamliner, F-35 Joint Strike Fighter), automobiles and trucks (e.g. Chevrolet ZR1 Corvette, U.S. Army's HEMTT A3 tactile wheeled vehicle), spacecraft (e.g. SpaceShipOne), energy production (e.g. wind turbines), marine vessels (e.g. U.S. Navy's All-Composite Littoral Combat Ship), prosthetic devices, sports equipment (e.g. bicycle frames), medical devices, civil engineering structures, and many others. Looking at the growth rate of the carbon fiber and carbon fiber reinforced composites market alone, it has been about 12% for the last 23 years and the market size for industrial (including aerospace) and sporting goods made of carbon composite is slated to grow from over $7 billion in 2007 to $12.2 billion by 2011 [Ref. 2—*Composite Application Market Assessment—A Global Overview*, Frost & Sullivan (www.frost.com), published May 13, 2008].

Although composite materials are typically more expensive than most engineering metals and their alloys by weight (e.g. ~$15-50/kg for aerospace-grade carbon/epoxy prepreg vs. >$1/kg for structural steel), the major problem limiting their use in products and subassemblies is arguably manufacturing time and expense. For example, a typical sequence of steps for high-performance thermoset composite manufacturing includes removal of thermoset prepreg roll from cold storage, cutting individual layers using a CNC cutter, hand working the manually heated layers into an open mold (known as "hand layup") or over a core to form a laminate or sandwich, vacuum bagging the uncured composite over a dedicated mold, curing for hours it in an autoclave under high heat and pressure, debagging the composite workpiece, trimming and post machining in final geometrical features, inspection and finally fastening or bonding the final part to another structure [Ref. 3—Website link: http://www.compositesworld.com/articles/nacelle-manufacturers-optimize-hand-layup-and-consider-closed-molding-methods.aspx?terms=%40pub_CW_type+%3d++Feature].

Certainly not all composite systems and parts require each of the aforementioned labor, time, and energy-intensive manufacturing processes, but the more challenging applications do, particularly where weight reduction and performance are the driving factors such as with aerospace parts. The major issues with composites manufacturing are highlighted in a recent issue of Aerospace & Defense Manufacturing magazine, where several articles written by industry people and experts identify hand layup and autoclaving as the two major process bottlenecks, especially for the network of suppliers to major aerospace companies [Ref. 4—Bullen, G. N., "Get Rid of Those Autoclaves!" *Manufacturing Engineering* (Society of Manufacturing Engineers), Vol. 140, No. 3, March 2008 and Ref. 5—Morey, B., "Automating Composites Fabrication," Manufacturing Engineering (Society of Manufacturing Engineers), April 2008 Vol. 140 No. 4, April 2008]. With regards to curing the composite, which is the focus of this patent application, one author went as far to say that "eliminating autoclaves is the 'Holy Grail' of composite manufacturers" [Ref. 6—Aronson, R., "Composites & Superalloys Fill Aerospace Needs," *Manufacturing Engineering* (Society of Manufacturing Engineers), Vol. 140, No. 3, March 2008].

2. The Prior Art

Thermoset composite parts made by either wet layup or prepreg layup are typically vacuum bagged to remove air (called debulking), before and during the curing process. A typical vacuum bagging layup is shown in FIG. 1 [Ref. 7—Website link: http://media.photobucket.com/image/vacuum%20bagging%20composites/ebayPCI/VacuumBag-Layup.jpg, accessed on Nov. 10, 2009].

The most common method for consolidating and curing a vacuum-bagged composite laminate is by using an autoclave. An autoclave is a pressure vessel that allows simultaneous application of vacuum to the bagged part, the application of external pressure to the outside of the bag to provide higher differential pressure, and heat to raise and hold the laminate's temperature to that level recommended by the material manufacturer [Ref. 8—Strong, A. B., *Fundamentals of Composites Manufacturing: Materials, Methods, and Applications*, 2nd Edition, Society of Manufacturing Engineers, Dearborn, Mich., 2008]. An inert gas (generally Nitrogen) is used in an autoclave to prevent oxidation of any components and explosions. A vacuum-bagged laminate such as that illustrated in FIG. 1 is loaded into an autoclave.

Consistent with the strong feelings against autoclaving by the composites industry, there has been some research and development devoted to eliminating the autoclave process step altogether. For example, Blair [Ref. 9—Blair, Michael. *Composites: Success, Opportunity and Challenge*. Composites Manufacturing Conference, 2007, Society of Manufacturing Engineers, Apr. 12, 2007] mentions efforts to lay and bond thermoplastic prepreg tape using ultrasonics and matrix materials which cure when exposed to ultraviolet radiation.

Other researchers have looked at using electron beams, gamma rays and microwaves for curing composites [Ref. 10—J N Hay, J. N. and O'Gara, P., 2006, "Recent developments in thermoset curing methods," *Proceedings of the Institution of Mechanical Engineers*, Part G: Journal of Aerospace Engineering, Vol. 220, No. 3, pp. 187-195]. However, a more practical approach to address immediate industry needs is to develop alternative composite curing processes that work for existing thermoset matrix materials already on the market.

Tubular thermoset composite parts, such as a tennis racquet, require internal pressurization by wrapping the prepreg material around a bladder, placing the assembly into a heated "clamshell" mold, and pressurizing the bladder to force the wound laminate against the inner mold surfaces until cured [Ref. 8 above]. This is called "bladder molding," and a schematic of the basic process is shown in FIG. 2. [Ref. 11-Website: http://www.carbonbydesign.com/features/features_bladder.asp, accessed on Nov. 10, 2009].

The exact opposite of bladder molding is consolidating and curing a tubular thermoset composite part using external pressure from a fluid. A patent by Park [Ref. 12—Park, J. F., "Method and System for Curing Fiber Reinforced Composite Structures," U.S. Pat. No. 5,643,522, 1997] discusses a long annular-shaped bladder contained within a cylindrical pressure vessel. Long prepreg composite parts would be inserted within the annulus, the ends are closed with endcaps, and heated pressurized fluid circulating through the bladder envelopes the composite part to cure it. Rapid changes in temperature are achieved by a fluid control system which can divert fluid maintained at three different temperature ranges in three large tanks. This eliminates the need to thermally cycle a single fluid reservoir.

A very similar apparatus and method for curing composites to that of Park was invented by Graham [Ref. 13—Graham, N., "Method of Manufacturing Composites," U.S. Pat. No. 6,149,844, 2000]. In this apparatus, one side of the prepreg laminate is guided by a flexible diaphragm material. On the other side of the laminate is a shaped tool floating on another flexible diaphragm, which is used to impart the required surface shape and finish to the composite. The prepreg part to be cured is placed in direct contact with the mold after it is sprayed with a release material. Heated and pressurized Heat Transfer Fluid (HTF) supplied behind both flexible diaphragms sandwiches the tool and prepreg laminate to cure it.

By including two or more sources of HTF at different temperatures, the curing chamber and thus the laminate being cured can be heated and subsequently cooled more quickly. Also, by maintaining these respective fluids in large reservoirs, the need to thermally cycle the temperature of a single fluid chamber is eliminated, thus increasing the energy efficiency of the system. This technology has proven to be extremely successful and is commercially available through Quickstep Technologies Ltd. [Ref 14—Website: http://www.quickstep.com.au/what-is-quickstep/how-quickstep-works, accessed on Sep. 20, 2008]. Quickstep also vibrates the HTF and draws vacuum between the diaphragms early in the curing cycle to remove entrapped air as shown in FIG. 3 [Ref. 15—Website: http://compositecenter.org, accessed on Nov. 10, 2009].

Kemp [Ref. 16—Kemp, D. N. "Fixed-volume, trapped rubber molding method," U.S. Pat. No. 4,889,668, 1989] patented a process called 'fixed-volume trapped rubber molding,' where the thermal expansion of a heated rubber mold that is constrained to a fixed volume provides the pressure and heat required to consolidate and cure a thermoset composite laminate part.

Another alternative to autoclaving is "prepreg compression molding" [Ref. 8 above]. A prepreg layup is placed by hand into the cavity of a heated match mold in the open position. The mold is closed bring the male and female mold halves together to exert pressure on the prepreg layup for further consolidation. After the part has cured, the mold halves separate and the part is removed. A schematic of the compression molding process for a 2-D part is shown in FIG. 4 [Ref. 17—Website: http://www.greenhulk.net/forums/showthread.php?t=22098, accessed on Nov. 10, 2009]. Blackmore [Ref. 18—Blackmore, R., "Advanced Cured Resin Composite Parts and Method of Forming Such Parts," U.S. Pat. No. 5,648,137, 1997 and Ref. 19—Blackmore, R., "Method of Forming Advanced Cured Resin Composite Parts," U.S. Pat. No. 5,656,231, 1997] invented a compression molding system for curing composite parts, where each mold half contains a conductive layer that is used to provide resistive heating for curing prepreg composite parts. The molds must be constructed of a material with similar expansion and contraction coefficients to ensure that even pressure and temperature are provided.

SHORTCOMINGS OF THE PRIOR ART

There are a number of shortcomings related to the prior art in curing and consolidating thermoset composite parts, which are described below.

Autoclaving—Autoclaving is a time and energy-intensive, and costly process that requires the use of very expensive equipment. Autoclaves are general purpose machines and ideally suited for curing a variety of part shapes and composite systems. However, this manufacturing flexibility comes at the expense of energy efficiency, and process cost and throughput. This is painfully evident when visiting a large composites production shop and seeing how production is limited by the capacity of their autoclaves. Production is severely hampered if their autoclaves are not working, because they typically have no other process and equipment for curing thermoset composite parts that require high consolidation pressure.

Bladder Molding—This process is limited to tubular parts, which is not the focus of the invention described herein.

Quickstep Process—Maximum pressure of the HTF during curing is a relatively low 0.4 MPa according to the company website. Other issues with the Quickstep process are that the equipment is expensive, and the company requires licensees to pay relatively high royalty fees on each composite part cured, thereby essentially limiting Quickstep use only to large companies that can afford it.

Fixed-Volume, Trapped Rubber Molding—This process is a radical departure from standard autoclaving in that the working medium for pressurizing and heating the prepreg laminate is no longer a gas (nitrogen) but rather a thermally expanding elastomer. Technically, the laminate need not be vacuum bagged as the entire tool chamber is evacuated. Problems with this process, however, include:

heating and cooling times are very slow due to the elastomer's low thermal conductivity;
there is no guarantee of uniform pressure for complex part shapes;
tooling is also very elaborate because of all the heating/cooling loops required; and
debulking is more difficult without the use of breather cloth.

Compression Molding—The matched mold must be carefully designed to provide a very precise gap to contain the prepreg laminate as the mold halves close. Anything else but a perfect fit between the molds will result in composite matrix leaking out to form matrix flash. Furthermore, the process is limited to small parts [see Ref. 8 above].

A need remains for a new and improved thermal pressing process for composite parts.

SUMMARY OF THE INVENTION

It is an object of the present invention to provide a means for consolidating and curing of thermoset composite parts by pressing between a heated rigid mold and customized rubber-faced mold.

Another object of the invention is to provide a method and apparatus for forming a cured composite part that places and registers a composite laminate, consisting of consolidated layers of woven or unidirectional fiber pre-impregnated with thermoset polymer matrix (called 'prepreg'), onto the curing surface of a heated curing mold and provides a base mold with base surface covered by a rubber mask having a mask surface. The three-dimensional (3-D) surfaces of the curing, base and mask surfaces complement each other so when the curing and base molds are brought together with a uncured composite laminate in between, a uniform pressure is applied on the laminate perpendicular to the curing mold surface and transverse stresses (i.e. along laminate) are minimized. The base and curing molds are pressed together to squeeze the composite laminate between the rubber mask and the curing surface, and a vacuum is applied to the perimeter where the two molds meet to help consolidate the laminate prior to curing it.

The present invention is referred to as "thermal pressing" below and comprises a thermal pressing process and apparatus that consolidates and cures an advanced composite laminate by pressing it between a heated rigid mold called the curing mold, and a matching rubber-faced mold, called a base mold with a rubber mask. The complete tooling development and pressing process of the invention is shown in FIGS. 5 and 6 and is described in detail below. Although FIGS. 5 and 6 only show a two-dimensional part shape for the sake of clarity, the actual process is intended for complex three-dimensional shapes.

The following steps are practiced according to the invention.

Step 1—The development of thermal pressing tools of the invention requires specifications for curing temperature, time and pressure for the composite part. An FEA (Finite Element Analysis) model of the rubber mask with a particular stiffness (at the curing temperature) pressed between the part setting on the curing mold and the base mold must be made. The combination of the geometry of the base shape and thickness distribution of the rubber is synthesized by FEA simulation using an optimization algorithm so as to yield a uniform hydrostatic pressure on the laminate when the rubber mold is fully compressed into the curing mold.

Step 2—The base mold shape will be a three-dimensional surface (e.g., Non-Uniform Rational Basis Spline or NURBS) fit to the FEA-synthesized shape. It will then be CNC (Computer Numerically Controlled) machined out of machinable, rigid and thermally insulative material (e.g. hardwood or RenShape tooling board available from Huntsman Corporation) using CNC code generated by a CAM (Computer-Aided Machining) software based on the surface. An inverse of the rubber molding shape (based on the FEA simulation) will also be CNC machined out of some inexpensive material.

Step 3—Additional geometry included in the base mold includes small injection holes to allow for molding of the rubber mold surface and registration features for the inverse rubber mold to form a precise casting cavity. The inverse rubber surface mold will be coated with a release material (if needed) and then secured over the base mold. The two components of a room-temperature castable rubber (e.g. silicone base and catalyst) with a working temperature above that of the composite curing temperature (e.g. platinum-catalyzed silicones have >300° C. working temperatures) and specified stiffness will be pumped into a mixing head and then injected into the cavity under pressure along with a vacuum assist to remove air. This process will be similar to resin transfer molding (RTM).

Some castable rubbers, such as Silicone, generally do not bond well to mold surfaces, so the cast rubber layer or mask can be treated as an insert to the base mold or small features can be added into the base mold surface to create good mechanical adhesion.

Step 4—A curing mold is also made by CNC machining a suitable material (e.g. aluminum for quick release, mild steel for durability, Invar for high accuracy) in the exact shape of the part's mold-side surface. Since the mold must be temperature controlled, temperature sensors and a means of uniform heating are incorporated. The curing mold can be heated to temperature using a number of different methods including embedded cartridge heaters, membrane heaters, and heating fluid flowing through metal tubing attached to the mold closed channels machined into the mold.

In addition, the mold will have registration pins with the same diameter and locations as the tool used to originally form the composite shape (e.g., by hand layup or double diaphragm forming). In some cases, the geometrical complexity of the part shape itself will provide unique and accurate registration without the need for pins. In either situation, this will allow the workpiece to be accurately positioned on the tool. Release of the part from the mold is facilitated by a permanently bonded mold coating (e.g. ceramic reinforced Teflon from Donwell) or application of a release agent (e.g. Frekote made by Loctite).

Step 5—Parts are consolidated and cured in the following manner: first bringing the curing mold up to a temperature required to allow polymer matrix to flow easily (during consolidation) but not cure; placing the formed, but uncured laminate on the mold followed by a bleeder cloth layer; applying release to the rubber mold (if needed); pressing the rubber mold into the curing mold with a specified force to achieve the desired uniform surface pressure; applying an edge seal with vacuum port to draw vacuum between the molds to draw out excess gas and matrix into the bleeder cloth for a specified period of time; raising the mold temperature to the required polymer matrix curing temperature; and continuing to compress the laminate for the manufacturer-specified time until complete curing is achieved. The mold set with rubber mask and composite laminate in between will be insulated above and below with a stiff insulating material (e.g. wood) and on the outer sides using rigid insulation board to minimize heat loss. Once the curing cycle is completed, the molds are released, and then the cured workpiece is quickly removed to cool down in air prior to further machining and processing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 5:
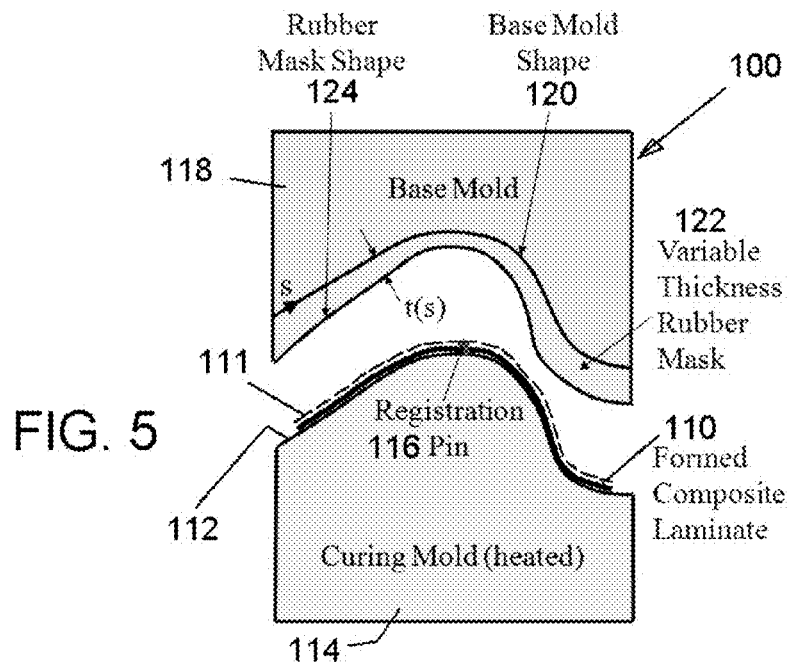
FIG. 5 is a schematic diagram of the thermal pressing process of the invention for composite curing with a variable thickness rubber layer shown open.
Figure 6:
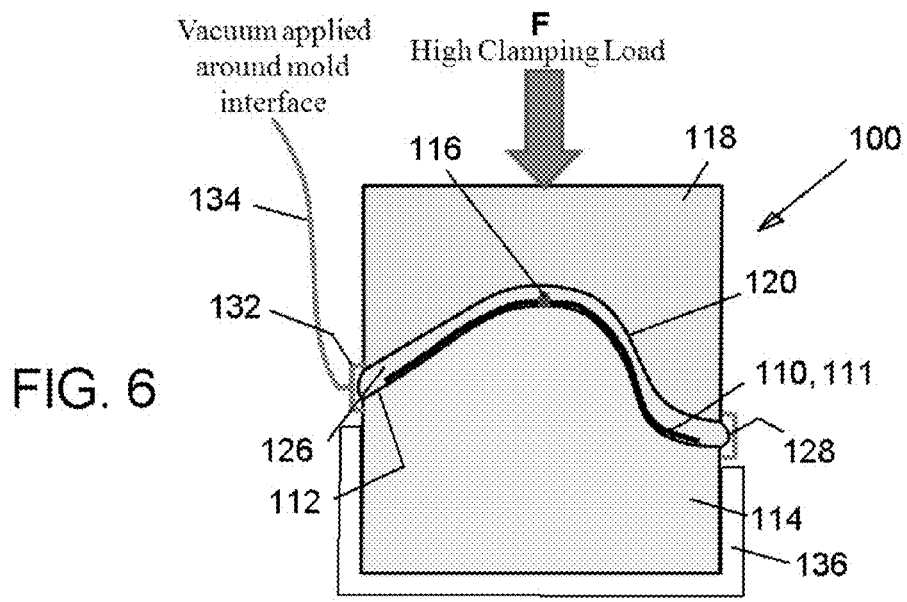
FIG. 6 is a view similar to FIG. 5 but of the molds clamping the formed composite laminate.

Referring now to the drawings, in which like reference numerals are used to refer to the same or similar elements, FIGS. 5 and 6 show the apparatus and method of the invention for forming a cured composite part without using an autoclave. The invention involves using a mold set 100 and placing a composite laminate 110, consisting of layers of woven or unidirectional fibers in a thermoset polymer matrix, onto a three-dimensional curing surface 112 of a heatable and temperature-controlled curing mold 114 of the mold set. A conventional bleeder cloth layer 111 is also added on top of the laminate to allow the escape of excess gas and resin during part curing, but it is removed after the process is completed and is not part of the final composite. The position of the composite laminate 110 is registered against lateral movement on the curing surface 112 by one or more registration pins 116 extending from the curing surface and through the composite laminate. Registration pins may not be needed if the part shape has sufficient geometrical features to ensure accurate and repeatable positioning on the curing surface 112.

The mold set 100 also includes: a base mold 118 of thermally insulating material having a three-dimensional base surface 120 that is covered by a rubber mask 122, the rubber mask also having a three-dimensional surface 124 that is opposite from the base surface 120 and faces the curing surface 112; and a temperature-controlled curing mold 114 insulated on all exposed sides 136 to minimize heat loss. Shapes of the curing surface 112, the base surface 120 and the mask surface 124 complement each other so that when the curing mold 114, covered with the composite laminate 110 and porous bleeder cloth 111, is brought in contact with the base mold 118 covered with the rubber mask 124 (e.g. by lowering the base mold 118 or raising the curing mold 114, or both), a specific uniform pressure is achieved at the top of the laminate surface 110 when a known clamping force F is applied to the mold set 100, as shown in FIG. 5. The gap between the curing mold shape 112 and base mold shape 120 forms the pressure space 126 shown in FIG. 6. The pressure space has a perimeter 128 around the adjacent curing mold surface 112 and base mold surface 120. This application of clamping force simultaneously compresses the rubber mask 124, bleeder cloth 111 and laminate 110 within the pressure space 126. The shape of the base mold 118 and thickness distribution t(s) of the rubber mask, as shown in FIG. 5, are specifically designed to achieve the aforementioned uniform pressure during the entire consolidation and curing process for the composite part.

Prior to compressing and curing the laminate 110 within the pressure space 126, the curing mold 114 is rapidly heated to and maintained at a temperature that is sufficient to allow the thermoset polymer matrix to flow easily during laminate consolidation (removing excess gas and matrix through the bleeder cloth 111). The formed laminate 110 is placed on the curing mold 114 followed by the bleeder cloth layer 111. While pressing the base and curing molds against each other in the direction of arrow F during laminate consolidation, the perimeter 128 of the pressure space 126 is exposed to a partial vacuum via vacuum hose 134 and vacuum cover 132 covering the perimeter 128 of the pressure space 126, thereby removing excess gas and matrix through the bleeder cloth 111. After the part is pressed within the pressure space for sufficient time to achieve adequate consolidation of the laminate 110, the curing mold temperature is then increased and held at the curing temperature of the thermoset polymer matrix for sufficient time until the composite part is fully cured.

Design of the Base Mold and Rubber Mask:

To ensure uniform fiber volume ratio and thickness, the composite part 110 should be exposed to uniform hydrostatic pressure during curing as described in Step 5 in the Summary section above. In other words, the frictional forces at the rubber-to-laminate (surface 124 to laminate 110) interface must be small and the deviation of the normal pressure distribution from the mean value should be minimized. A non-parametric computational technique, based on the FEA, is developed to solve this multi-objective shape optimization problem [Ref. 20—Haslinger, J. and Mäkinen, R., *Introduction to Shape Optimization: Theory, Approximation and Computation*. Society for Industrial and Applied Mathematics, 2003]. While multiple commercially available software platforms allow shape and topology optimization (e.g. OptiStruct, TOSCA), they are not suitable for the specific problem in this invention. The core of the inventive optimization strategy is implemented by coupling a commercial finite element solver and a custom routine developed as a subroutine to the solver. For example, Nastran is a general purpose finite element solver which allows geometry discretization and analysis based on linear as well as nonlinear material and geometric models, and it is designed to handle constrained minimization problems including goal attainment problems, minimax problems, and semi-infinite minimization problems using gradient-based as well as genetic algorithm-based techniques.

The design problem consists of finding the solution of a set of finite element equations $h(s,d)=0$, where "s" is the vector of "state variables" (e.g. nodal displacement and pressures) and "d" is the vector of "design variables" (e.g. the thickness of the rubber layer at discrete intervals), which minimize an objective function $\Psi P(s,d)$ with the design variables subject to individual constraints. For example, to ensure uniform pressure distribution at the part-rubber interface ($\Gamma_{rp}$), an objective function of the form $$\Psi = \int_{\Gamma_{rp}} (p - \bar{p})^2 dS$$

may be appropriate, where "p" is the pressure distribution on ($\Gamma_{rp}$) and $\bar{p}$ is the mean pressure. The solution will be performed in an iterative manner with an initial guess on the base mold shape. In each incremental simulation step, the solution of the finite element equations for a given set of design variables will be computed using FEA and the resulting reaction forces at the rubber mask-part interface will be passed to the subroutine written for the FEA solver to evaluate the objective function and update the design variables. The optimization process will terminate when the optimality conditions are satisfied with the last updated configuration.

The end result will be a base mold shape and specified rubber mask thickness distribution that will theoretically yield a uniform hydrostatic pressure on the composite laminate pressed between these two molds. Trying to accomplish this by trial-and-error experimentation would be utterly impractical, if not impossible for all but the simplest of part shapes (e.g. slightly curved composite plate).

DIFFERENCES BETWEEN PRESENT INVENTION AND PRIOR ART

Significant differences between the present invention and prior art are discussed in this section.

Autoclaving—In terms of energy consumption and cost of consumables, thermal pressing offers significant improvements over traditional autoclaving. The prolonged temperature and pressure ramp-up and ramp-down associated with autoclaving is essentially eliminated, because through-thickness heating of the uncured laminate by direct conduction from the heating tool is relatively instantaneous, and there is no pressure vessel involved. There is also no need for an autoclave, which, as previously mentioned, is a very expensive machine that uses significant amounts of energy. To help quantify the energy and capital expense benefits, the following example is given.

A new 4'×6' autoclave for composites processing that can accommodate six vacuum-bagged composite parts costs $214K and draws a maximum of 200 kW of energy for both its heaters and circulating fan [Ref. 21—Quote from Bondtech Corporation, Somerset, Ky. for a Model BCT56"× 6'2"-300P-302F autoclave received by Kintz Plastics on Apr. 23, 2008]. If a 0.25 m part must be cured for 7 hours at 130° C. plus a 1 hour temperature/pressure ramp-up and ramp-down, then the six identical parts that can be accommodated in this autoclave would require (200 kW×9 hours×0.5)÷(6 parts)=150 kW hrs of energy per part for an estimated 50% duty cycle (estimate from manufacturer). By comparison, a 0.25 meter square part that was cured via thermal pressing by Hoffman [Ref. 22—(not yet published) Hoffman, C., "Development of an Advanced Composites Manufacturing Facility," M. S. Thesis, Department of Mechanical, Aerospace & Nuclear Engineering, Rensselaer Polytechnic Institute, Troy, N.Y., 2009] required only a 1 kW flat silicone heater contacting the bottom of an aluminum tool and controlled using a thermocouple mounted onto the composite part. Excluding the mold, all materials for thermal pressing, including a 30 ton press, cost less than $1000. Six or more identical heated mold/rubber mold sets with proper alignment features and suitable thermal isolation can be stacked in a column and pressed with the same force using a vertical hydraulic press according to the present invention. Even if the silicone heater had a 100% duty cycle, only 7 kW hrs of energy would be required per part. The point is that even if the estimates for this thermal pressing example are off by 100% or more, there is at least an order-of-magnitude reduction in capital equipment cost and energy consumption if thermal pressing were used instead of autoclaving.

In addition to reduced energy consumption, the time, expense, and waste associated with vacuum bagging and the associated consumables (e.g. vacuum bag material, sealing tape) are either eliminated or minimized considerably. The autoclave pressure vessel is usually pressurized with nitrogen to avoid any threat of explosion, whereas thermal pressing is a closed process that does not require nitrogen. Finally, the energy, waste, and cost benefits scale proportionally with production volume without even considering the lack of equipment redundancy with autoclaving. The thermal pressing process is intended for higher production work, since production capacity is not equipment limited as with autoclave curing; rather, each mold set works independently of all others.

Bladder Molding—This process is intended for tubular parts, whereas thermal pressing of the present invention is intended for open parts.

Quickstep Process—The primary differences between Quickstep and thermal pressing of the present invention is the tooling and also the medium for transferring heat and pressure. Quickstep uses a heat transfer fluid (HTF) contained within two open-ended boxes covered with a flexible bladder to provide part heating and uniform pressure. The mold is a thin layer of material that floats on top of the lower bladder. Thermal pressing of the present invention transfers heat by direct conduction from the curing tool, and avoids having to pump large volumes of HTF as with Quickstep. Uniform pressure with thermal pressing is achieved by a custom-designed thermal mask. Overall, thermal pressing is much simpler and significantly less expensive to implement than Quickstep.

Fixed-Volume, Trapped Rubber Molding—This process relies on thermal expansion of a rubber mold that conforms to a composite laminate shape to provide uniform pressure on the part during curing. Active heating and temperature control of the rubber and rigid curing molds are required during the entire process. However, there is no guarantee that the pressure on the laminate part is uniform without performing numerical structural/thermal analysis. Depending on the boundary conditions (e.g. friction) and shape of the part and fixed volume, it may, in fact, provide a very non-uniform pressure distribution over the part surface. This will lead to unwanted variations in part thickness as resin is squeezed out of high pressure areas. Another issue is the transient thermal distribution in the rubber as it heats up. Rubber (e.g. silicone) is a very good insulator, so one would expect large temperature gradients throughout the tool and a long time before it reaches thermal equilibrium.

Thermal pressing of the present invention has significant differences over trapped rubber molding. Uniform pressure is achieved by careful design of the base mold and rubber mold and by the rapid application of a particular clamping force. In other words, the process of the present invention is more repeatable and requires significantly less ramp-up time than trapped rubber molding. Heating (and cooling) of the part during thermal pressing will be nearly instantaneous, because the curing tool is already heated, the base mold and rubber mask are thermal insulators, and the part has a low thermal mass by comparison. All sides will be insulated. Trapped rubber molding requires longer heat-up and cool-down times. Finally, trapped rubber molding tools will be more expensive, because of the system required for precise thermal control and a more rigid containment structure than thermal pressing disclosed here.

Compression Molding—Compression molding does not guarantee uniform pressure on the part, because the matched mold is designed to provide a precise gap for the prepreg material. Given the potential for mold distortion from thermal gradients or high forming pressures, it is difficult to maintain close tolerances, especially thickness, for large compression molded parts. The inventive thermal pressing is much more forgiving. Also, mold costs for compression molding will be significantly greater than for thermal pressing.

Advantages of Present Invention:

As previously stated, there are significant advantages to thermal pressing over prior and current art including (but not limited to):

More rapid heat-up and cool down of the composite part;
Significantly less consumables than other processes, especially autoclaving;
Lower tooling cost;
Significantly less energy than most existing processes;
Only one heated tool is required;
Lower capital expenses to implement and operate; and
Mold sets can be stacked and loaded into a single clamping press. No other process has this capability.

Value Proposition for those Practicing the Invention:

If any company practicing the invention keeps thermal pressing in-house, it will be able to manufacture many thermoset composite parts at significantly lower cost and time than their competition. If the technology is licensed but the thermal pressing apparatus is retained in-house, customers will be able to make tools quicker and at less cost than all other current processes and, most importantly, reduce the capital expenses, recurring expenses (including material and energy) and cycle time of thermoset composite part consolidation/curing.

Test Results—Thermal Pressing:

Two types of silicone rubber have been investigated, to date, for use in the present invention; castable platinum-catalyzed P15 and P45 from Eager Polymers (Chicago, Ill.). Tensile and compression tests were performed using the ASTM D412 and ASTM D395 standards, respectively, on a low-force Instron Universal Testing Machine (UTM). Compression tests were performed at a range of temperatures from room temperature (20° C.) to a realistic advanced composite curing temperature (177° C.) using an environmental control chamber. Additionally, friction tests based on ASTM G115 were performed to determine the coefficient of static friction for the rubber with aluminum, steel, and uncured composite contact surfaces. The material testing results are shown in Table 1.

TABLE 1

Material Properties of Silicone Rubber Used for Thermal Pressing

| Rubber | Tensile Modulus (MPa) | | Tensile Strength (MPa) | Poisson's Ratio | Static friction coefficient | | |
|---|---|---|---|---|---|---|---|
| | 20° C. | 177° C. | | | Aluminum | Steel | Uncured Composite |
| P15 | 291 | 374 | 3.2 | 0.49 | 1.7 | 1.8 | 2.0 |
| P45 | 726 | 1019 | 5.5 | 0.49 | 2.1 | 2.1 | 2.3 |

Figure 7:
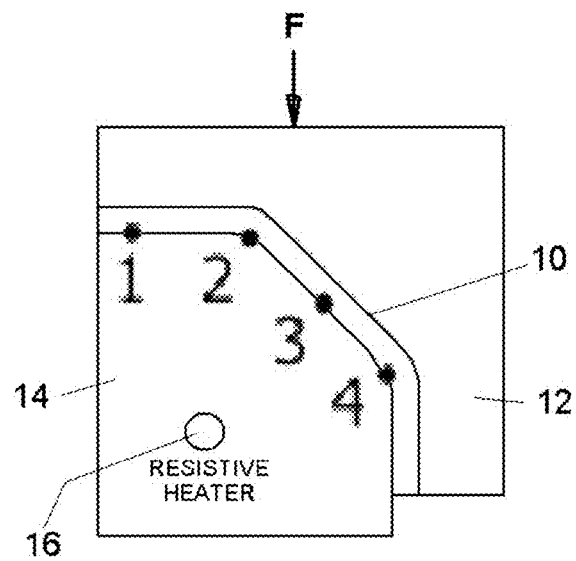
FIG. 7 is a schematic partial sectional view of a mold set setup for testing the invention.
Figure 8:
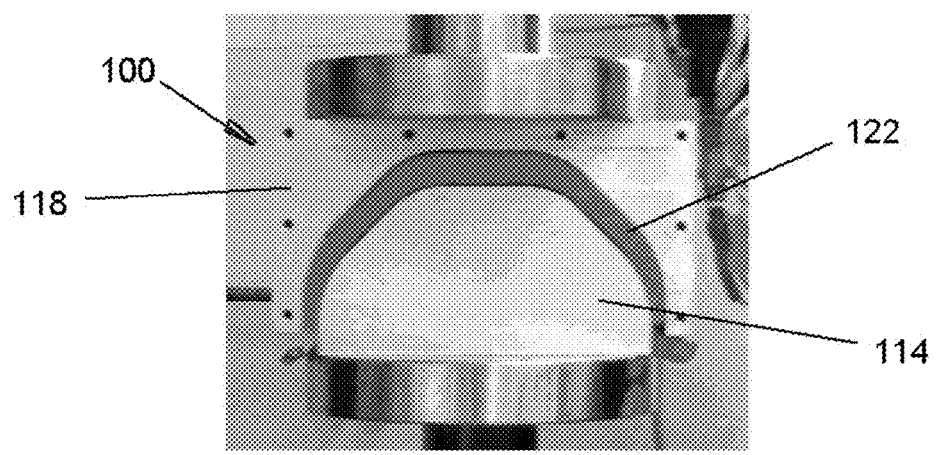
FIG. 8 is a side view of a 2-D thermal pressing mold set with variable-thickness silicone rubber mask.

An aluminum mold set (right half of mold is shown in FIG. 7 and actual mold set is shown in FIG. 8) was designed and fabricating for thermal pressing of 2-D composite shapes. P45 rubber was cast in between a male curing mold 12 (13 cm wide×7 cm high) and female base mold 14 spaced 6 mm apart to form the rubber mask 10. During thermal pressing of composite parts, two resistive heating cartridges 16 in the curing mold serve as the heating source for the composite material. The cartridges were sized and located in the mold 14 to provide a uniform temperature distribution at the curing surface. With the curing mold heated to a particular temperature setpoint in the upper range for thermoset composites, the temperature distribution of the mold surface at steady-state was measured at four points 1, 2, 3 and 4, along the center-line of half 14 of the mold and along the edge of the mold using type K thermocouples, as shown in FIG. 7. To help thermally isolate the mold from the environment, it was wrapped in high-temperature fiberglass insulation. Additionally, the mold was placed under load in the direction of arrow F as is experienced during the thermal pressing process. An additional test confirmed that the temperature distribution along the entire length of the mold was symmetrical. The results of the temperature measurements are shown in Table 2. The most interesting result is the uniformity of temperature at the mold surface.

TABLE 2

Figure 1:
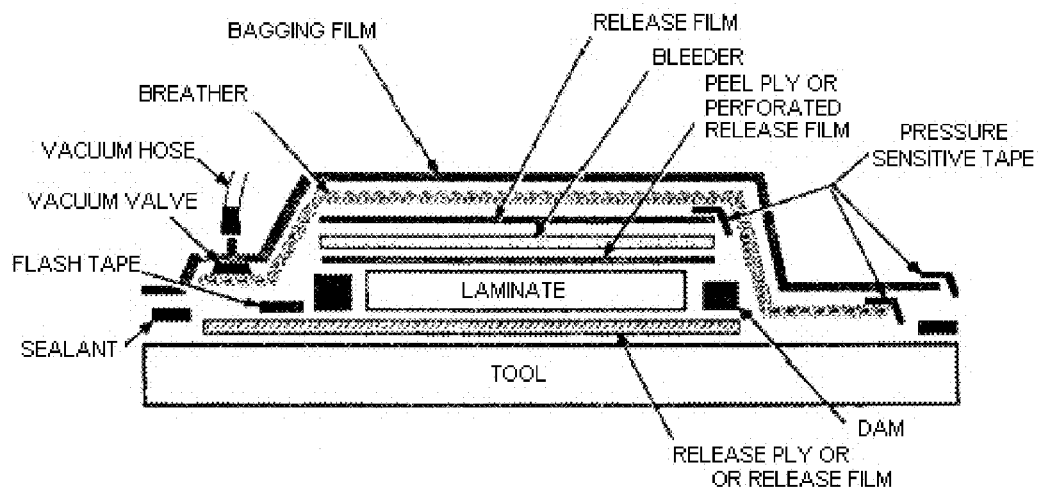
FIG. 1 is a schematic sectional view of a prior art layup sequence for a composite vacuum bagging operation.
Figure 2:
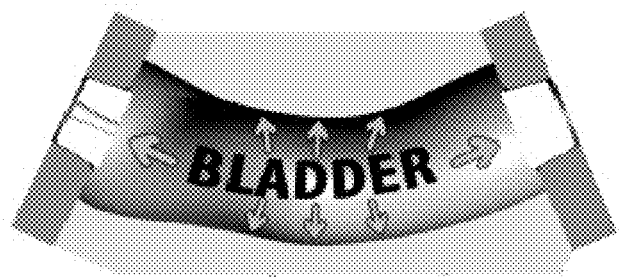
FIG. 2 is a schematic illustration of a prior art bladder mold for consolidation and curing of tubular composite parts.
Figure 3:
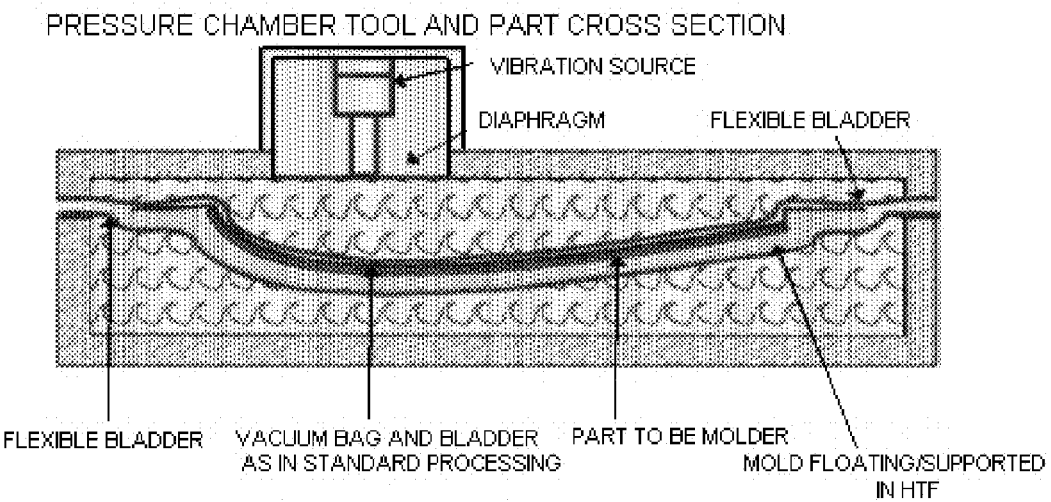
FIG. 3 is a schematic representation of the Quickstep process.
Figure 4:
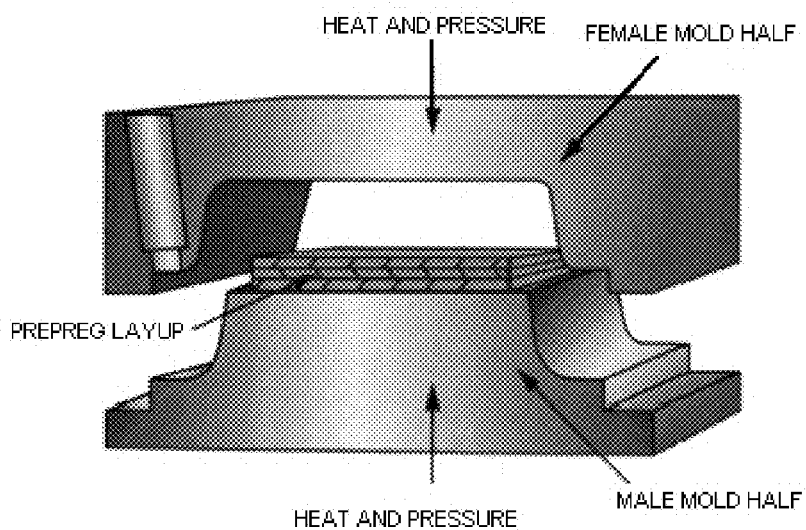
FIG. 4 is a perspective view of a known prepreg compression molding system.

Temperature Measurements (In ° C.) at Points Shown in FIG. 2 of 2-d Aluminum Mold Set Heated with 2 Cartridge Heaters and in Clamped Condition

| Point | Centerline of half of the mold | Centerline of the full length | | Edge of half of the mold |
|---|---|---|---|---|
| | | Left half | Right half | |
| 1 | 186.6 | 184.9 | 184.7 | 185.4 |
| 2 | 184.6 | | | 183.8 |
| 3 | 185.8 | 185.2 | 185.0 | 184.6 |
| 4 | 181.6 | | | 181.0 |

Figure 9:
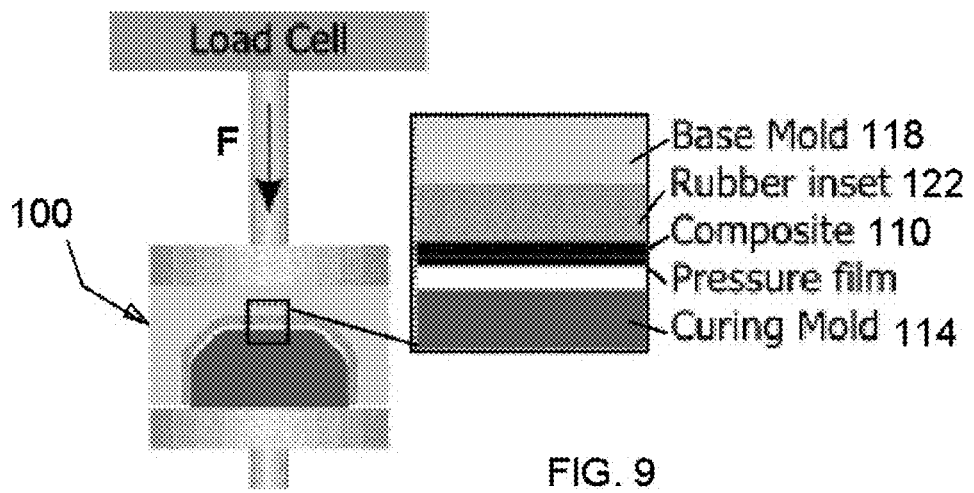
FIG. 9 is a schematic representation of a thermal pressing experimental setup with 2-D mold set of the invention.
Figure 10:
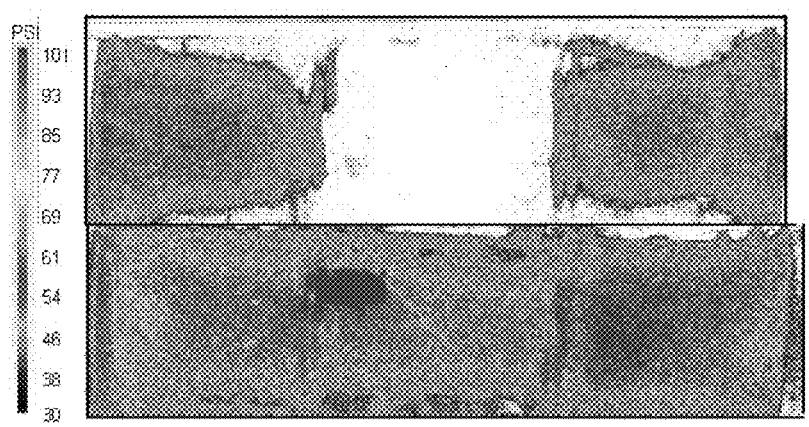
FIG. 10 is a graph plotting experimentally measured pressure distribution along the mold/composite interface for a 2D mold set with uniform thickness (upper image) and variable thickness (lower image) rubber masks.

Pressure distributions were also measured using Pressurex© (a registered trademark of Sensor Products Inc.) pressure sensitive film for a range of loads on an 8-ply carbon/epoxy prepreg composite layup under mold compression (using a UTM) for P45 silicone rubber masks with the uniform thickness (6 mm gap as shown in FIG. 7) and variable thickness (6 mm gap on edges to 13 mm gap in middle as shown in FIG. 8). The thermal pressing experimental setup is shown in FIG. 9. As seen in FIG. 10 upper image, the uniform thickness rubber mask (inset) showed considerable localized pressure on the sloping section of the curing mold for an applied clamping load of 4.5 kN (1000 lbs), which resulted in the pressure at the middle of the mold (points 1 and 2 in FIG. 7) falling outside of the pressure range for the film. The mask 122 in FIG. 8 was intuitively designed to have more thickness (and compliance) towards the middle to prevent binding that occurs in the side walls, which meant lower pressure towards the middle of the mold 100 during pressing. In fact, the variable thickness inset showed a much more uniform pressure distribution for the same applied load as shown in FIG. 10, lower image. Although this 2-D example is very simplistic, it clearly demonstrates how varying rubber thickness can dramatically effect pressure distribution.

A preliminary FEA of the molds under compression (using MSC Nastran) showed a similar trend in the results. Using 3-dimensional models of the molds and rubber mask, a discretized system was established with fixed boundary conditions for the bottom of the curing mold, rolling boundary conditions for the curing mold face, and a pressure boundary condition on the top of the base mold. Table 3 compares the same four points considered in the thermal measurements for the computational and experimental results for both the uniform and variable thickness rubber masks.

TABLE 3

Comparison of Computational and Experimental Results of Pressure (In Psi) at the Points Shown in FIG. 7

| Points: | 1 | 2 | 3 | 4 |
|---|---|---|---|---|
| Uniform Thickness/Computational | 56.8 | 57.6 | 60.1 | 72.9 |
| Uniform Experimental | n/a | n/a | ~95 | ~93 |
| Variable Computational | 51.2 | 51.4 | 46.2 | 43.1 |
| Variable Experimental | ~93 | ~98 | ~94 | ~88 |

While specific embodiments of the invention have been shown and described in detail to illustrate the application of the principles of the invention, it will be understood that the invention may be embodied otherwise without departing from such principles.

What is claimed is:

1. An apparatus for consolidating and curing a laminate composite part comprising a polymer matrix and reinforcing fibers, without vacuum bagging and without then using an autoclave, the apparatus comprising:

a temperature-controlled rigid mold with a three-dimensional curing surface having the shape of the composite part, for receiving a composite laminate consisting of at least one polymer matrix layer containing oriented reinforcing fibers;

means for registering the composite laminate against lateral movement on the curing surface;

a rigid base mold having a three-dimensional base surface that is covered by a rubber mask of variable thickness, the rubber mask having a three-dimensional mask surface opposite from the base surface and facing the curing surface, the rubber mask being made of castable rubber, the rubber mask being in direct contact across the surface of the base mold, and the variableness of the rubber mask being designed to provide a substantially uniform pressure;

three-dimensional shapes of the curing surface, the base surface and the mask surface complementing each other so that when the curing mold, having the uncured composite laminate on the curing surface thereof, is brought into contact with the base mold covered with the rubber mask by lowering the base mold or raising the curing mold, or both, a pressure space is formed by a gap between the curing mold shape and base mold shape containing the rubber mask and composite laminate, the pressure space having a perimeter around the adjacent base surface and curing surface;

heating means for heating the curing mold to a temperature that is sufficient to lower the viscosity of the polymer matrix of the laminate and allow excess gas and polymer matrix to escape during composite laminate consolidation, and also to a temperature that is sufficient to cure the laminate following consolidation; and pressing means for pressing the base and curing molds against each other to close the pressure space for squeezing the composite laminate between the rubber mask and the curing mold for sufficient time and with uniform pressure to consolidate and cure the composite laminate.

2. The apparatus of claim 1, wherein the base mold is made of thermally insulating material.

3. The apparatus of claim 1, wherein the rubber mask is attached to the base mold.

4. The apparatus of claim 1, wherein the rubber mask is separate from the base mold.

* * * * *